B. W. FJELLMAN.
BALL BEARING.
APPLICATION FILED FEB. 3, 1915.

1,143,375.

Patented June 15, 1915.
2 SHEETS—SHEET 1.

Witnesses:
L. J. Wallace
Ethel C. Nelson

Inventor:
Bengt Wiktor Fjellman
By Attys.
Fraser, Turk & Myers

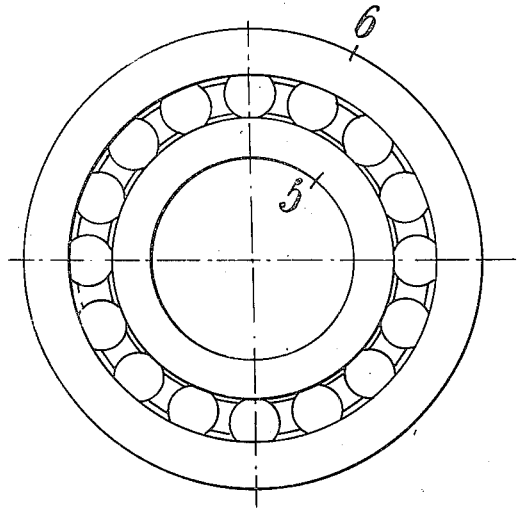
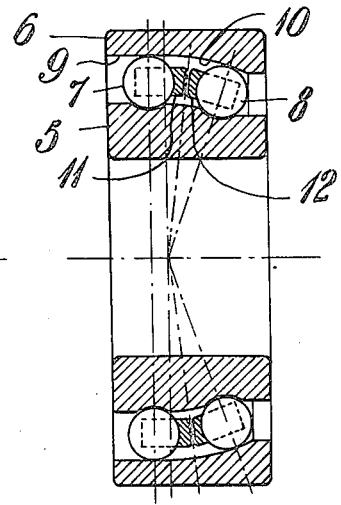
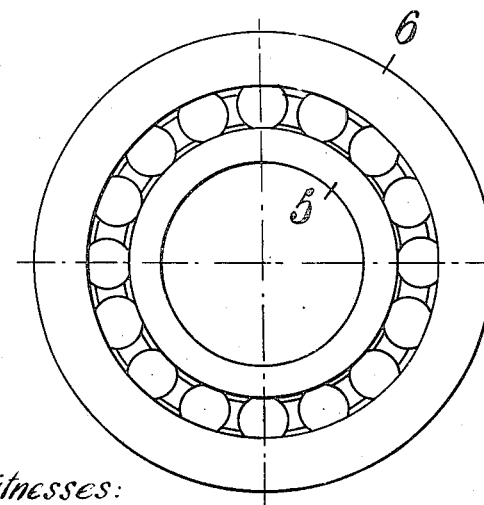
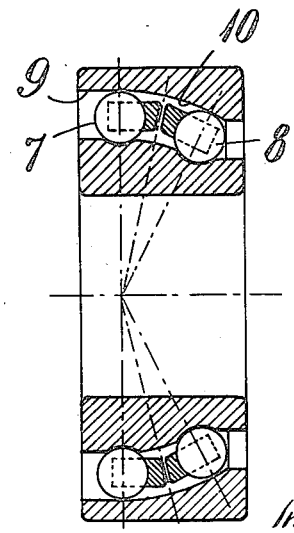

UNITED STATES PATENT OFFICE.

BENGT WIKTOR FJELLMAN, OF GOTTENBORG, SWEDEN.

BALL-BEARING.

1,143,375.   Specification of Letters Patent.   Patented June 15, 1915.

Application filed February 3, 1915. Serial No. 5,892.

*To all whom it may concern:*

Be it known that I, BENGT WIKTOR FJELLMAN, a citizen of the Kingdom of Sweden, residing at Gottenborg, Sweden, have invented new and useful Improvements in Ball-Bearings, of which the following is a specification.

This invention relates to ball bearings having two or more sets of balls of the type which is adapted to sustain radial as well as axial loads and in which one of the bearing rings is provided, on the one hand, with a cylindrical ball track for the set or sets of balls serving to sustain radial pressures only and on the other hand with a ball track for the other set or sets of balls serving to sustain axial pressure only or, if necessary, also a part of the radial pressure, said latter track being inclined in relation to the geometrical axis of the bearing and formed according to a sphere or any other suitable rotary surface.

The principal object of the invention is to render both sets of balls adapted to perform their separate functions in a more effective and reliable manner than is the case in so called rigid bearings.

Another object is to provide a bearing of the class in question which may be designed with greater accurateness in respect of the strains to which the balls and the tracks will be exposed, with the result that the bearing will be stronger and more durable, since the balls are not liable to be exposed to incalculable strains.

With these objects in view the invention consists, mainly, in this, that the bearing rings are movable to a certain extent in relation to each other in axial direction.

The accompanying drawings illlustrate some constructional forms of the invention.

Figure 1:
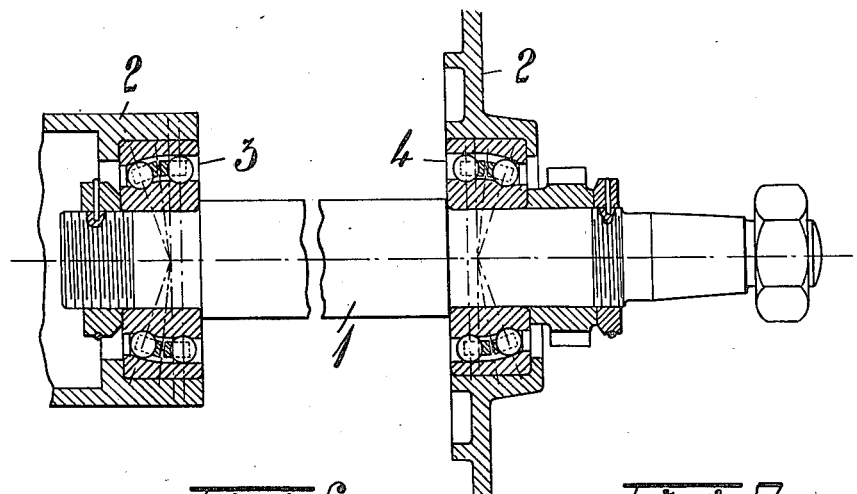
Figure 6:
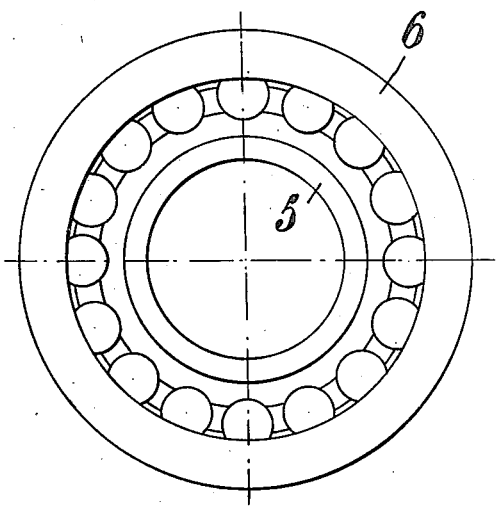
Figure 7:
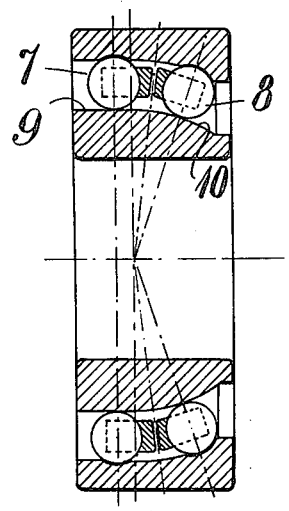

Figure 1 shows in a sectional view a bearing intended for a magneto having two bearings arranged according to the invention. Fig. 2 is a side view and Fig. 3 is a sectional view showing the bearing illustrated in Fig. 1. Figs. 4 and 5 show views corresponding to Figs. 2 and 3, respectively, of a modified form of the bearing. Figs 6 and 7 are corresponding views of another modified form.

Referring to Fig. 1, 1 designates the shaft of a magneto, said shaft being supported by ball bearings 3 and 4 placed in the stator 2 of the magneto. The construction of these ball bearings will appear more readily from Figs. 2 and 3, in which 5 designates the inner bearing ring and 6 the outer bearing ring. Between said rings two sets of balls 7 and 8 are disposed. The inner bearing ring 5 is, preferably, provided with grooves in which the balls move. The outer bearing ring 6 is provided with a cylindrical ball track 9 for the set of balls 7 and with a spherical ball track 10 for the set of balls 8. The generatrix of the spherical surface 10 is inclined in relation to the geometrical axis of the bearing, so that the center of the sphere lies at the side of the plane through the set of balls 7 at right angles to the axis. Independent ball cages 11 and 12 serve to guide each of the sets of balls 7 and 8, respectively, in the bearing. As will appear from Fig. 3, this bearing construction will permit a certain axial movement of both bearing rings in relation to each other, since the set of balls 7 can roll in axial direction on its cylindrical race, while the set of balls 7, if necessary, can leave its race on the ring 6. In case the bearing is not exposed to any axial load pressing the set of balls 8 against its spherical track, the total radial load will be taken up by the set of balls 7. If, on the contrary, an axial pressure strain is acting in the direction toward the end of the shaft, where the bearing is placed, said pressure strain will be taken up by the set of balls 8, which in such case also will have to sustain part of the radial load. When mounting the bearings 3 and 4 according to Fig. 1, a certain possibility of axial movement is afforded to the shaft, which on account thereof will become very easily movable and, if necessary, can be exposed to axial loads in either direction, without causing incalculable strains in the bearing.

In the bearing shown in Figs. 2 and 3 the center of the spherical surface is situated at the side of the plane through the set of balls 7 at right angles to the shaft, so that each of the loads acting on the two sets of balls 7 and 8 is directed toward its own center situated on the geometrical axis of the bearing. On account thereof the inner bearing ring cannot perform any swinging movements relatively to the outer ring.

In the constructional form shown in Figs. 4 and 5 such a swinging movement will, on the contrary, be possible, because the centers of pressure of both sets of balls 7 and 8 coincide. This is effected in such manner that the set of balls 7 is placed on the great circle of the spherical ball track on the outer bearing ring 6. In other respects the bearing according to Figs. 4 and 5 is constructed in the same manner as the bearing according to Figs. 2 and 3. It is not necessary that the cylindrical surface forms an immediate extension of the spherical surface, as is shown in Figs. 3 and 5, since the cylindrical surface may be extended across the center of the spherical surface, thereby creating an abrupt transition between the cylindrical and the spherical ball tracks.

In the form shown in Figs. 6 and 7 the outer bearing ring 6 is provided with trough-shaped ball tracks for guiding both sets of balls 7 and 8. The inner bearing ring is provided, on the one hand, with a cylindrical ball track 9 for the row of balls 7 and on the other hand with a spherical ball track 10 for the set of balls 8. Both centers of pressure may be placed at a distance from each other, as is shown in Figs. 3 and 7 of the drawing, or may coincide, as in the form shown in Fig. 5.

It is to be noted that the forms of bearing shown in the drawings are illustrative of my invention and that changes in construction may be made within the scope of the claims without departing from the spirit of the invention.

Having now described my invention, what I claim as new and desire to secure by Letters Patent is:

1. A ball bearing adapted to sustain axial and radial loads and having bearing rings, one of which is provided with a cylindrical ball track for some of the balls and with a ball track for other balls, said latter track being formed according to a rotary surface, the generatrix of which surface is inclined to the axis of the bearing, said bearing rings being movable in axial direction in relation to each other, substantially as and for the purpose set forth.

2. A ball bearing adapted to sustain axial and radial loads and having bearing rings, one of which is provided with a cylindrical ball track for some of the balls and with a spherical ball track for other balls, the generatrix of which sphere is inclined to the axis of the bearing, said bearing rings being movable in axial direction in relation to each other, substantially as and for the purpose set forth.

3. A ball bearing adapted to sustain axial and radial loads and having bearing rings, one of which is provided with a cylindrical ball track for some of the balls and with a spherical ball track for other balls, the generatrix of which sphere is inclined to the axis of the bearing, said bearing rings being movable in axial direction in relation to each other, and the balls rolling on the cylindrical ball track being situated, in the normal position of the bearing rings, on the great circle of the spherical surface, substantially as and for the purpose set forth.

In testimony whereof I have hereunto set my hand in presence of two subscribing witnesses.

BENGT WIKTOR FJELLMAN.

Witnesses:
PATRICK RYDBECK,
VICTOR WESTERBERG.